United States Patent Office 3,052,655
Patented Sept. 4, 1962

---

3,052,655
THERMAL POLYMERIZATION OF AMINO ACID MIXTURES CONTAINING ASPARTIC ACID OR A THERMAL PRECURSOR OF ASPARTIC ACID
Sidney W. Fox, 1114 Waverly Road, and Kaoru Harada, 662 W. Call St., both of Tallahassee, Fla.
No Drawing. Filed Aug. 1, 1958, Ser. No. 752,417
2 Claims. (Cl. 260—78)

This invention concerns copolymers of α-amino carboxylic acids containing combined aspartic acid together with one or more other α-amino acids, and their method of preparation.

The art is replete with unsuccessful attempts to heat-polymerize natural amino acids to form polypeptides.

It has now been discovered that copolymers containing a combined aspartic acid and one or more other α-amino carboxylic acids can be prepared by heat-polymerizing aspartic acid together with one or more other α-amino carboxylic acids or proline at a reaction temperature between about 140° and about 210° C., advantageously in the presence of a sufficient proportion (preferably equimolar) of concentrated (e.g., 85 percent or higher) phosphoric acid to give a liquid reaction medium and in the presence of an inert atmosphere, advantageously $CO_2$ or $N_2$. A particularly advantageous proteinoid polyimide results when a preponderance of combined glutamic and aspartic acids, together with a balance of the amino acids found in protein (including all of the essential amino acids) are copolymerized. The resulting polyimide is then hydrolyzed with an aqueous solution of an alkali metal hydroxide to give a polypeptide alkali metal salt which is acidified with a mineral acid to give a polypeptide. The molecular weight of the condensation polymers so obtained increases as the temperature (up to 200° C.) or time of reaction is increased.

In practice, the mixture of amino acids is heated to temperatures ranging from about 140° to about 210° C., advantageously in an oil bath, for a time sufficient to give a polyimide of the desired molecular weight, advantageously from about 15 minutes to about 24 hours. The addition of an equimolar amount or less of concentrated phosphoric acid, e.g., of 85 weight percent concentration or higher, based on the total amount of amino acid present, to give a liquid reaction mixture facilitates reaction, so that a lower reaction temperature can be used. The use of phosphoric acid also promotes the formation of higher molecular weight polymers and usually gives higher yields. However, the reaction is operable in the absence of added acid, although a starting temperature about 20° C. higher, i.e., at least 160° C., is required in the absence of phosphoric acid. The resulting polyimide linkages are hydrolyzed by heating to about 80° C. with an alkali metal hydroxide or carbonate, e.g., NaOH, KOH, $Na_2CO_3$, $K_2CO_3$, for about 10 to 15 minutes, advantageously an equivalent amount, or by treatment at room temperature with an excess, e.g., of one-normal NaOH. The resulting polypeptide salt is then acidified with a mineral acid, advantageously to a pH of about 3, to liberate the polypeptide. Analyses of the obtained products include end group assay, as in Nature 167: 513 (1951), average molecular weight, as in Biochim. Biophys. Acta 7: 547 (1961), and total amino acid composition by hydrolysis, chromatography and dinitro phenylation, as in J.A.C.S. 76: 1328 (1954), and Nature 167: 513 (1951).

The products of this invention yield continuous films from water solutions which are useful for temporary protection at low humidities. The films can be removed by a water wash.

The following examples illustrate specific embodiments of this invention.

EXAMPLE 1—ASPARTIC ACID-GLUTAMIC ACID COPOLYMERS

In each of three test tubes was placed 1.47 g. (0.01 mole) of L-glutamic acid, which was heated for 30 minutes at 180° C. To each of these in series was added 0.01, 0.02, and 0.03 mole, respectively, of DL-aspartic acid and the reactants were heated for 2½ hr. at 170° C. and 1 hr. at 180° C. The amber product was cooled, rubbed with 10 ml. of water, and stirred until a granular precipitate formed. After overnight standing, the resultant precipitate was separated at the centrifuge and washed successively with 10 ml. each of water and ethanol. The products dried in a vacuum desiccator over $H_2SO_4$ were weighed as such, and again after aqueous dialysis in cellophane for 7 days, and drying in the desiccator. Results obtained follow in Table I.

TOTAL AND N-TERMINAL COMPOSITION OF POLYMERS FROM ASPARTIC ACID AND PYROGLUTAMIC ACID IN THREE MOLAR RATIOS

| DL-Aspartic Acid Reacted, g. | L-Glutamic Acid Reacted, g. | Yield of Crude Polymer, g. | Yield of Polymer After Dialytic Washing, g. | Aspartic Acid Content, Mole Percent | Glutamic Acid Content, Mole Percent | N-Terminal | |
|---|---|---|---|---|---|---|---|
| | | | | | | N-Aspartic Acid | N-Glutamic Acid |
| | | | | | | ΣN-Amino Acid, Mole Percent | ΣN-Amino Acid, Mole Percent |
| 1.33 (0.01 mole) | 1.47 (0.01 mole) | 1.08 | 0.83 | 71 | 29 | 41 | 59 |
| 2.66 (0.02 mole) | 1.47 | 1.88 | 1.44 | 81 | 19 | 46 | 54 |
| 3.99 (0.03 mole) | 1.47 | 2.21 | 1.66 | 85 | 15 | 46 | 54 |

EXAMPLE 2.—COPOLYMERIZATION OF DL-ASPARTIC ACID AND L-GLUTAMIC ACID

In a typical copolymerization of glutamic acid and aspartic acid, 44.1 g. (0.30 mole) of L-glutamic acid was heated at 180° for 40 min. and to the resultant melt of pyroglutamic acid was added 39.9 g. (0.30 mole) of DL-aspartic acid and the combination was heated at 180°–185° C. for 4 hr. The cooled mixture was treated with 180 ml. of water and rubbed until a granular precipitate formed. The polymer was filtered and washed with 100 ml. of water and 80 ml. of ethanol. The remaining solid was then washed in a cellophane dialysis bag for 7 days. After drying, the polymeric product weighed 44.2 g., and was biuret-positive and ninhydrin-negative. The liquor in the dialysis bag, representing a solution of low molecular weight polymers, was dried in a vacuum desiccator to give 0.27 g. of a yellow, gelatin-like, water-soluble polyimide.

EXAMPLE 3.—COPOLYMERIZATION OF DL-ASPARTIC ACID HYDROCHLORIDE AND L-GLUTAMIC ACID

Pyroglutamic acid (1.29 g., 0.01 mole) was heated with 4.2 g. (0.025 mole) of aspartic acid hydrochloride for 3 hr. at 180°–184° C. Gas evolution occurred. Coloration was minimal. To the cooled mixture was added 10 ml. of water. A white precipitate resulted. Both the precipitate and mother liquor were biuret-positive. The precipitate was filtered and washed with 10 ml. each of water and ethanol. Drying gave 2.6 g. of product. Hydrolysis with 6-normal hydrochloric acid for about 11 hr. at reflux and paper chromatography showed both glutamic acid and aspartic acid.

The following two examples show in situ formation of reactant aspartic and glutamic acids.

EXAMPLE 4.—COPOLYMERIZATION OF MALIC ACID AND L-GLUTAMINE

DL-malic acid, 1.34 g. (0.01 mole), and 1.46 g. (0.01 mole) of L-glutamine were ground together in a mortar and heated at 180° C. for 2 hr. Gas was evolved. After cooling, the glassy product was rubbed with 15 ml. of water which converted the glass to a granular solid. The mixture was allowed to stand for two days, filtered, and washed with 15 ml. of water and 10 ml. of ethanol. The dry amber solid weighed 0.60 g. Its infrared spectrum was identical with that of the polymers obtained by heating glutamic acid and aspartic acid together. The hydrolyzate returned aspartic acid and glutamic acid on papergrams.

In quantitative analysis of the polymer, the dinitrophenyl method revealed 15 mole percent of glutamic acid and 85 percent of aspartic acid.

EXAMPLE 5.—COPOLYMERIZATION OF DL-MALIC ACID AND MONOAMMONIUM L-GLUTAMATE

An intimate mixture of 1.34 g. (0.01 mole) of DL-malic acid and 1.64 g. (0.01 mole) of monoammonium L-glutamate was heated at 180°–183° C. for one hour, at which time gas evolution had ceased. The product was worked up as in the case of the glutamine-malic acid reaction to give 0.55 g. of powder having the same infrared pattern. The acidic hydrolyzate returned 15 mole percent glutamic acid and 85 percent aspartic acid on papergrams, as in the reaction involving glutamine.

EXAMPLE 6.—EFFECT OF TIME OF HEATING AT 175° C. ON YIELDS, AMINO ACID COMPOSITION AND AVERAGE MOLECULAR WEIGHT OF POLYMER FROM ASPARTIC ACID AND GLUTAMIC ACID [1]

| Time of Heating, Hr. | Yield of Crude Polymer, g. | Yield of Polymer After Dialytic Washing, g. | Recovery of Polymer After Dialytic Washing, Percent | Aspartic Acid Content, Mole Percent | Glutamic Acid Content, Mole Percent | Average Molecular Weight |
|---|---|---|---|---|---|---|
| ½ | 0.45 | 0.07 | 16 | 81 | 19 | 15,000 |
| 1 | 1.23 | 0.08 | 65 | 82 | 18 | 14,000 |
| 2 | 1.92 | 1.48 | 77 | 76 | 24 | 18,000 |

[1] Aspartic acid, 0.02 mole, and glutamic acid, 0.01 mole, heated as started.

EXAMPLE 7.—EFFECT OF VARIATION IN TEMPERATURE ON YIELD, COMPOSITION AND AVERAGE MOLECULAR WEIGHT OF POLYMER FROM ASPARTIC ACID AND GLUTAMIC ACID [1]

| Temp. ° C. | Yield of Crude Polymer, g. | Yield of Polymer After Dialytic Washing, g. | Recovery of Polymer After Dialytic Washing, Percent | Aspartic Acid Content, Mole Percent | Glutamic Acid Content, Mole Percent | Average Molecular Weight |
|---|---|---|---|---|---|---|
| 160 | 1.38 | 0.01 | 7 | (2) | (2) | (2) |
| 170 | 1.07 | 0.89 | 83 | 86 | 14 | 13,000 |
| 180 | 1.54 | 1.21 | 79 | 82 | 18 | 13,000 |
| 190 | 1.70 | 1.32 | 78 | 82 | 18 | 15,000 |
| 200 | 2.23 | 1.86 | 83 | 86 | 14 | 17,000 |
| 210 | 2.38 | 1.95 | 82 | (2) | (2) | (2) |

[1] Aspartic acid, 0.02 mole, and glutamic acid, 0.01 mole, heated for one hour as stated.
[2] Not determined.

EXAMPLE 8.—EFFECT OF PHOSPHORIC ACID ON REACTION BETWEEN 0.01 MOLE ASPARTIC ACID AND 0.01 MOLE GLUTAMIC ACID, ONE HOUR REACTION TIME

| Temp., ° C. | Yields After Dialysis, g. Without $H_3PO_4$ | Yields After Dialysis, g. With $H_3PO_4$ | Ave. Mol. Wt. |
|---|---|---|---|
| 150 | 0 | 0.44 | |
| 160 | trace | 1.61 | |
| 170 | 0.89 | 1.76 | 6,740 |
| 180 | 1.21 | 2.09 | 11,800 |
| 190 | 1.32 | 2.13 | 12,300 |
| 200 | 1.86 | 2.14 | 33,600 |
| 210 | 1.95 | 2.18 | 25,600 |

An equimolar proportion of aqueous 85 weight percent $H_3PO_4$ was used, amino acid basis.

EXAMPLE 9.—PROTEINOID COPOLYMER

A quantity of 2.0 g. of L-glutamic acid was heated for 1 hr. in an open test tube in an oil bath at 170° C. To this was added a ground mixture of 2.0 g. DL-aspartic acid and 1.0 g. of an amino acid mixture which was made up from 400 mg. DL-alanine, 400 mg. L-arginine·HCl, 800 mg. DL-aspartic acid, 400 mg. L-cystine, 470 mg. L-glutamic acid, 400 mg. glycine, 400 mg. L-histidine·HCl, 400 mg. DL-isoleucine, 400 mg. DL-leucine, 300 mg. L-lysine·HCl, 400 mg. DL-methionine, 400 mg. DL-phenylalanine, 400 mg. L-proline, 400 mg. DL-serine, 400 mg. DL-threonine, 800 mg. DL-tryptophan, 400 mg. L-tyrosine, and 400 mg. DL-valine. The entire mixture was heated for 3 hr. in an oil bath at 170° C. under a blanket of $CO_2$. After the glassy product cooled, it was rubbed into 10 ml. of water, which converted the material to a granular solid. This was allowed to stand one day, was filtered on a Büchner funnel, and was washed with 10 ml. of water and 10 ml. of ethanol. After the solid was dried, it was set in a cellophane dialysis bag and subjected to dialytic washing for four days by changing the outside water bath four times per day. The total contents of the bag was checked and found to be ninhydrin-negative after two or three days. The proteinoid nature of the polymer was substantiated by a biuret test and infrared analysis. A 100 mg. dried sample of the product (mol. wt. 4900) was then refluxed with 30 ml. of 6-normal HCl for 12 hr. The resulting liquid was concentrated in a vacuum desiccator over NaOH and $H_2SO_4$ with an infrared lamp. The residue was taken up in approximately 0.5 ml. $H_2O$ and chromatographed first with phenol-water (4:1) and in the second dimension with butanol-acetic acid-water (4:1:1). The chromatogram was then sprayed with ninhydrin. Typical protein hydrolyzate patterns were observed in the chromatograms. The proteinoid, as obtained above, was found to be useful as a substitute for peptone in peptone broth for culturing *Lactobacillus arabinosus*.

The polyimides resulting from copolymerization of aspartic acid with another α-amino carboxylic acid are dissolved with stirring a minimum amount of alkali metal hydroxide or carbonate, advantageously about one-normal, and the resulting polypeptide salt is acidified, advantageously to a pH of about 3, with a mineral acid such as hydrochloric acid to give the desired polypeptide. In the case of the polyimide prepared from 0.03 mole aspartic acid and 0.1 mole glutamic acid, a proportion of 1.5 g. of it was dissolved in 15 ml. of one-normal NaOH, heated for 10 minutes at 80° C. to convert it to the sodium salt of polypeptide, acidified to a pH of about 3 with 3-normal hydrochloric acid and then dialyzed for three days. A yellow, gelatin-like substance, 0.45 g., was obtained by dialysis and evaporation. This material, of equivalent weight 136, was ninhydrin-negative and biuret-positive.

What is claimed is:

1. A polyimide condensation product of aspartic acid and a member of the group consisting of basic, acidic, and neutral α-aminocarboxylic acids and mixtures thereof, the basic α-aminocarboxylic acids having a proportion of two basic groups per carboxylic group, each of said basic groups being a member of the group consisting of an amino group, a glyoxaline ring group and a guanidine group, at least one of which basic groups is an amino group, the neutral α-aminocarboxylic acids having a proportion of one amino group to one carboxylic group and the acidic α-aminocarboxylic acids having a proportion of one amino group to two carboxylic groups, respectively, and wherein when the co-reactants consist of aspartic acid and neutral amino acids a plurality of neutral amino acids are present, prepared by reacting said amino acids at a temperature between about 160° and 210° C. for a time sufficient to form a polyimide.

2. Process for making a ninhydrin-negative biuret test positive polyimide by reacting a mixture consisting of a preponderance of substantially equal proportions by weight of glutamic and aspartic acids together with a minor proportion of each of alanine, arginine, cystine, glycine, histidine, isoleucine, leucine, lysine, methionine, phenylalanine, proline, serine, threonine, tryptophan, tyrosine, and valine at a temperature between 140° and 210° C. in the presence of an equimolar proportion of concentrated phosphoric acid for a time sufficient to form a polyimide, as determined by infrared analysis.

References Cited in the file of this patent

UNITED STATES PATENTS 2,293,388    Hanford _____ Aug. 18, 1942

OTHER REFERENCES

Bamford et al.: Synthetic Polypeptides (1956), pp. 10–16, 324–332 and 372, published by Academic Press, Inc., N.Y.

Fox et al.: Federation of Am. Soc. Exp. Bio., Proceedings, vol. 13, 1954, page 211.

Fox et al.: Science, vol. 124, November 9, 1956, pages 923–5.

Harada et al.: J. A. C. S., vol. 80 (July 5, 1958), pages 2694–2697.

Kovacs et al.: Experientia, vol. 9, 1953, pp. 459–460.

Meggy: J. Chem. Soc., pages 1444–1454 (1956).

Myer: Natural and Synthetic High Polymers, 1942, pages 424–427. Published by Interscience Publ., Inc., N.Y.